United States Patent [19]

Lee, Jr. et al.

[11] Patent Number: 5,166,264

[45] Date of Patent: Nov. 24, 1992

[54] POLYPHENYLENE ETHER/POLYOLEFIN COMPOSITIONS

[75] Inventors: Gim F. Lee, Jr., Albany; John B. Yates, III, Glenmont, both of N.Y.

[73] Assignee: General Electric Company, Selkirk, N.Y.

[21] Appl. No.: 372,218

[22] Filed: Jun. 23, 1989

Related U.S. Application Data

[63] Continuation-in-part of Ser. No. 232,611, Aug. 15, 1988, abandoned.

[51] Int. Cl.⁵ .................. C08L 53/02; C08L 71/12
[52] U.S. Cl. ........................... 525/92; 525/905
[58] Field of Search ............. 525/92, 905, 132

[56] References Cited

U.S. PATENT DOCUMENTS

| | | |
|---|---|---|
| 3,257,357 | 6/1966 | Stamatoff . |
| 3,257,358 | 6/1966 | Stamatoff . |
| 3,306,874 | 2/1967 | Hay . |
| 3,306,875 | 2/1967 | Hay . |
| 3,362,851 | 1/1968 | Gowan . |
| 3,835,200 | 9/1974 | Lee, Jr. . |
| 4,110,303 | 8/1978 | Gergen et al. . |
| 4,113,800 | 9/1978 | Lee, Jr. . |
| 4,166,055 | 3/1979 | Lee, Jr. . |
| 4,242,263 | 12/1980 | Lee, Jr. . |
| 4,383,082 | 5/1983 | Lee, Jr. . |
| 4,410,651 | 10/1983 | Hoaf et al. ............. 525/92 |
| 4,764,559 | 8/1988 | Yameuchi et al. ....... 525/92 |
| 4,772,657 | 9/1988 | Akyama et al. ......... 525/92 |

FOREIGN PATENT DOCUMENTS 42-7069  3/1967  Japan ................. 525/132

*Primary Examiner*—Jacob Ziegler
*Attorney, Agent, or Firm*—Hedman, Gibson & Costigan

[57] ABSTRACT

Compositions of a polyphenylene ether, a polyolefin, and a certain copolymers of a vinyl aromatic compound conjugated with an alkene such as styrene-ethylene butylene-styrene triblock elastomers exhibit improved ductility and decreased delamination tendencies compared to prior art compositions.

31 Claims, No Drawings

This application is a continuation in part of Ser. No. 07/232,611, filed Aug. 15, 1988 now Abandoned.

POLYPHENYLENE ETHER/POLYOLEFIN COMPOSITIONS

FIELD OF THE INVENTION

The present invention relates to novel resin compositions comprising polyphenylene ethers and polyolefins combined with particular copolymers of a conjugated alkene with a vinyl aromatic compound.

BACKGROUND OF THE INVENTION

The term "polyphenylene ether" resin is descriptive of a well-known group of polymers that may be made by a variety of catalytic and non-catalytic processes.

The polyphenylene ethers are known and described in numerous publications, including U.S. Pat. Nos. 3,306,874 and 3,306,875 (Hay); and U.S. Pat. Nos. 3,257,357 and 3,257,358 (Stamatoff). They are useful for many commercial applications requiring high temperature resistance and, because they are thermoplastic, they can be formed into films, fibers and molded articles. In spite of these desirable properties, parts molded from polyphenylene ethers are somewhat brittle and exhibit poor impact strength. In addition, the relatively high melt viscosities and softening points are considered a disadvantage in many uses. Films and fibers can be formed from polyphenylene ethers on a commercial scale using solution techniques, but melt processing is commercially unattractive because of the high temperatures required to soften the polymer and the problems associated therewith, such as instability and discoloration. Such techniques also require specially designed process equipment to operate at elevated temperatures. Molded articles can be formed by melt processing techniques, but, again, the high temperatures required are undesirable.

In addition, although the polyphenylene ether resins have outstanding hydrolytic stability, making them very useful in contact with aqueous media, e.g. in dishwasher and laundry equipment, they will soften or dissolve when placed in contact with many aggressive solvents, e.g., halogenated or aromatic hydrocarbons and gasoline, which limits their use in automotive applications.

It is known in the art that the properties of the polyphenylene ethers can be altered by forming compositions with other polymers and many such polyphenylene ether molding compositions have been disclosed in the prior art.

Kraton ® elastomers, available from Shell Oil Company, are commonly utilized as impact modifiers in polyphenylene ether compositions. One of the most important impact modifiers for polyphenylene ether compositions is a class of saturated rubbers known as Kraton G. Kraton G's are a saturated triblock copolymers of styrene-butadiene-styrene (SBS rubber). However, the ability to generate polyphenylene ether compositions with useful mechanical properties is not generally dependent on the Kraton. For example, compositions of polyphenylene ethers and rubber-modified polystyrene (HIPS) are not dependent upon Kraton elastomers for "compatibility", because polyphenylene ethers and rubber-modified polystyrene are essentially miscible in all proporations.

In U.S. Pat. No. 3,835,200 (Lee, Jr.), a composition comprising a matrix of polyphenylene ether, a grafted interpolymerization product of a styrene monomer and a diene rubber, and a normally rigid block copolymer comprising a vinyl aromatic compound (A) and a conjugated diene (B) of the A-B-A type is disclosed.

In U.S. Pat. No. 4,113,800 (Lee, Jr.), it is disclosed that molding compositions comprising a polyphenylene ether, a block copolymer of an alkenyl aromatic compound and a diene rubber, and a hydrogenated block copolymer of the A-B-A or A-B type wherein A is an alkenyl aromatic compound and B is a diene rubber block also have high impact properties. The total composition in U.S. Pat. No. 4,113,800 may contain from 10–30 parts by weight of polyphenylene ether resin, from 30–65 parts by weight of the A-B block copolymer and from 10–90 parts by weight of a reinforcing filler such as glass.

Blends of polyphenylene ethers and polyolefins are of great interest because they can bring some of the chemical resistance of the polyolefins to the polyphenylene ethers.

In a commonly-assigned patent, U.S. Pat. No. 3,361,851 (Gowan), polyphenylene ethers are formed into compositions with polyolefins to improve impact strength and resistance to aggressive solvents. Gowan discloses L that the polyolefin may comprise from 1–10% by weight of the total composition.

One serious limitation of all such systems is a severe tendency to undergo delamination, due to the agglomeration of dispersed domains into larger particles thereby causing deterioration of physical properties. Another limitation is brittleness of the marketed composition. The prior art has sought to improve the properties of these blends. SBS rubbers are commonly used to improve the compatibility of the two phases and to increase morphological stability in the melt. These systems are relatively inefficient because they require high levels of rubber to give a substantial effect.

For instance, in U.S. Pat. No. 4,166,055 (Lee, Jr.), compositions comprising a polyphenylene ether, an elastomeric block copolymer of a vinyl aromatic compound and a conjugated diene and a polyolefin, optionally containing a styrene homopolymer or random copolymer resin which are said to have improved toughness over compositions containing either the block copolymer or the polyolefin resin alone are disclosed. The polyolefin resin plus block copolymer of the A-B-A type is present at about 5–30% by weight of the total composition. The center block B is a conjugated diene of higher molecular weight than the combined weight of terminal blocks A.

In U.S. Pat. No. 4,383,082 (Lee, Jr.), it is . disclosed that larger amounts of polyolefin resin can be successfully incorporated in a polyphenylene ether resin when certain elastomeric diblock copolymers of the A-B type or radial teleblock copolymers comprising an alkenyl aromatic compound A and a conjugated diene B are used.

It is therefore an object of the present invention to provide polyphenylene ether/polyolefin resin compositions which have improved physical property profiles over prior art compositions.

In particular, it is an object of the present invention to provide polyphenylene ether/polyolefin resin compositions which have improved and suppressed delamination tendencies in comparison to prior art compositions.

It has now surprisingly been found that, unlike other polyphenylene ether/other resin blends wherein the blending of normally incompatible polymer resins is not believed to be dependent on the structure of the "compatibilizer", the blending of polyphenylene ether and polyolefins is dependent on the structural architecture of the A-B-A type triblock elastomer as well as the relative amounts of each component in the final composition for compatibilizing the polyphenylene ether and the polyolefin into non-delaminating materials useful for injection molding applications and which provide improved physical properties over the prior art.

SUMMARY OF THE INVENTION

In accordance with the aforementioned objectives, the present invention relates to resin compositions having beneficial physical and mechanical properties which may include improved resistance to delamination, improved solvent resistance and ductility said compositions comprising:
(a) polyphenylene ether resin,
(b) polyolefin resin, and
(c) a selectively hydrogenated block copolymer of a vinyl aromatic compound (A) and ($A^1$) and a conjugated diene (B), of the A-B-$A^1$, the center block B being of higher molecular weight than that of the combined terminal blocks A and $A^1$. Preferably the total molecular weight of (c) is from about 20,000 to about 200,000, more preferably from about 50,000 to about 200,000 and most preferably from about 50,000 to about 100,000. Essentially components (a) and (b) are present in a weight ratio of (a) to (b) of less than about 2:1, preferably less than about 1.3:1, more preferably less than about 1:1, and especially preferably in a ratio of 1:X where X is greater than 1 and preferably is greater than 1 and up to about 4. Preferably, component (c) is present in a minor amount, i.e. up to about 50% by weight, relative to 100% by weight of (a) and (b); more preferably is present in an amount of up to about 30% by weight, relative to 100% by weight of (a) and (b); especially preferably is present in an amount of between 20% and 30% by weight, relative to 100% by weight of (a) and (b), and most preferably is present in an amount of up to 20% by weight, relative to 100% by weight of (a) and (b).

In preferred embodiments of the present invention, the polyphenylene ether, component (a), comprises poly (2,6-dimethyl-1,4-phenylene) ether, and the polyolefin component (b) comprises LDPE, LLDPE, MDPE, HDPE, PP, high impact (copolymer) PP, or a mixture of any of the foregoing.

Also as used herein, the term "selectively hydrogenated" means that the subject A-B-A' type block copolymers have less than about 20% aliphatic unsaturation, have preferably less than about 10% aliphatic unsaturation, and especially preferably less than about 5% aliphatic unsaturation.

In other preferred embodiments, in component (c), (A) is a styrene block, (B) is an ethylene butylene block, and (Al) is a styrene block. In most preferred embodiments, blocks (A) and ($A^1$) each have molecular weights of from about 7000 to about 30,000 and center block (B) has a molecular weight of from about 30,000 to about 120,000.

DETAILED DESCRIPTION

The polyphenylene ether resins which comprise component (a) of the present invention are normally homo- or copolymers having units of the formula:

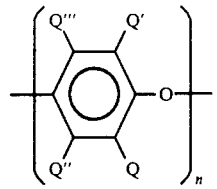

wherein Q, Q', Q" and Q''' are independently selected from the group consisting of hydrogen, halogen, hydrocarbon, halohydrocarbon, hydrocarbonoxy, and halohydrocarbonoxy; and n represents the total number of monomer units and is an integer of at least about 20, and more usually at least 50. The polyphenylene ether resin can be prepared in accordance with known procedures, such as those described in the above mentioned patents of Hay and Stamatoff, from the reaction of phenols including but not limited to: 2,6-dimethyl phenol; 2,6-diethylphenol; 2,6-dibutylphenol; 2,6-dilaurylphenol; 2,6-dipropylphenol; 2,6-diphenylphenol; 2-methyl-6-tolylphenol; 2-methyl-6-methoxyphenol; 2,3,6-trimethylphenol; 2,3,5,6,-tetramethylphenol, and 2,6-diethoxyphenol.

Each of these may be reacted alone to produce the corresponding homopolymer, or in pairs or with still other phenols to produce the corresponding copolymer. Examples of the homopolymer include:
poly (2,6-dimethyl-1,4-phenylene ether);
poly (2,6-diethyl-1,4-phenylene ether);
poly (2,6-dibutyl-1,4-phenylene ether);
poly (2,6-dilauryl-1,4-phenylene ether);
poly (2,6-dipropyl-1,4-phenylene ether);
poly (2,6-diphenyl-1,4-phenylene ether);
poly (2-methyl-6-tolyl-1,4-phenylene ether);
poly (2-methyl-6-butyl-1,4-phenylene ether);
poly (2,6-dimethoxy-1,4-phenylene ether;
poly (2,3,6-trimethyl-1,4-phenylene ether);
poly (2,3,5,6-tetramethyl-1,4-phenylene ether); and
poly (2,6-diethyoxy-1,4-phenylene ether).

Examples of the copolymer include those of 2,6-dimethylphenol with other phenols, such as poly(2,6-dimethyl-co-2, 3,6-trimethyl-1, 4-phenylene ether) poly(2,6-dimethyl-co-2-methyl-6-butyl-1,4-phenylene ether); and the like.

For purposes of the present invention, an especially preferred family of polyphenylene ethers include those having alkyl substitution in the two positions ortho to the oxygen ether atom, i.e., those of the above formula wherein Q and Q' are alkyl, most preferably alkyl having from 1 to 4 carbon atoms. Illustrative members of this class are:
poly (2,6-dimethyl-1,4-phenylene) ether;
poly (2,6-diethyl-1,4-phenylene) ether;
poly (2-methyl-6-ethyl-1,4-phenylene) ether;
poly (2-methyl-6-propyl-1,4-phenylene) ether;
poly (2,6-dipropyl-1,4-phenylene) ether;
poly (2-ethyl-6-propyl-1,4-phenylene) ether; and the like.

The most preferred polyphenylene ether resin for purposes of the present invention is poly (2,6-dimethyl-1,4-phenylene) ether.

Component (b) may comprise a wide variety of polyolefins. The ranges in amount of polyolefin and observations noted on delamination tendency of the compositions appear to be applicable to all of the polyolefins, as the critical features (as previously mentioned) are the structural aspects of component (c) and the relative proportions of the components in the final composition. The polyolefin may be any polymer formed from an olefin of the known general formula $C_nN_{2n}$, and is usually polyethylene, polypropylene, polyisobutylene, copolymers of ethylene and propylene, as well as copolymers of ethylene and organic esters such as ethylene vinyl acetate, ethylene ethyl acrylate, ethylene methyl acrylate and so forth. These are commercially available or are otherwise prepared from the known teachings.

Preferred polyolefins are polyethylene, polypropylene and polybutylene, especially LDPE, LLDPE, MDPE, HDPE, high impact (copolymer) PP, or combinations of any of the above. The resulting property profiles of the final composition will vary depending upon the particular polyolefin utilized.

The block copolymers of component (c) of the present invention, which comprise an alkenyl aromatic compound (A) and a conjugated alkene (B), are derived from compounds of the general formula:

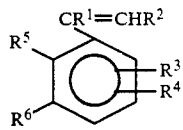

wherein $R^1$ and $R^2$ are selected from the group consisting of lower alkyl or alkenyl groups of from 1 to 6 carbon atoms and hydrogen, $R^3$ and $R^4$ are selected from group consisting of chloro, bromo, hydrogen and lower alkyl of from 1 to 6 carbon atoms; $R^5$ and $R^6$ are selected from the group consisting of hydrogen, lower alkyl and lower alkenyl group of 1 to 6 carbon atoms or $R^5$ and $R^6$ may be concentrated together with hydrocarbonyl groups to form a naphthyl group; said compounds being free of any substituent having a tertiary carbon atom. Preferred vinyl aromatic compounds are styrene, α-methyl styrene, vinyl toluene, vinyl xylene, vinyl naphthalene and the like. The alkene block is derived from a compound such as ethylene, propylene, butene-1, isobutylene, pentene, hexene, heptene, octene, dodecene, combinations of any of the above, and the like.

Preferred embodiments of component (c) provide styrene as the vinyl aromatic compound (A) and ethylene, propylene or butylene as the alkene (B). Most preferred embodiments of component (c) comprise styrene-ethylene butylene-styrene (S-EB-S) triblock elastomers. Furthermore, it has been found that favorable results are obtained when the ratio of (A) to (B) is preferably from about 28:72 to about 33:67 by weight. These preferred embodiments of component (b) are available commercially in the various Kraton elastomers, abovementioned. Details on the structural composition of a number of Kratons are provided in Table 1.

TABLE 1

| Kraton | Type | S/XX ratio | PS | XX | PS | Total |
|---|---|---|---|---|---|---|
| | | Block Copolymers | | | | |
| | | molecular weight (in thousands) | | | | |
| D-1101* | S-B-S | 30/70 | 14.0 | 64 | 14 | 92 |

TABLE 1-continued

| Kraton | Type | S/XX ratio | PS | XX | PS | Total |
|---|---|---|---|---|---|---|
| | | Block Copolymers | | | | |
| | | molecular weight (in thousands) | | | | |
| D-1102* | S-B-S | 28/72 | 9.5 | 47 | 9.5 | 66 |
| G-1650 | S-EB-S | 28/72 | 10.0 | 54 | 10 | 74 |
| G-1651 | S-EB-S | 33/67 | 29.0 | 116 | 29 | 174 |
| G-1652 | S-EB-S | 29/71 | 7.5 | 37 | 7.5 | 52 |

*The Kraton D triblocks are believed to contain about 20% diblock styrene-butadiene copolymer.

With respect to component (c), the block copolymers of vinyl aromatic compounds and conjugated alkenes are made by means well known in the art and are also available commercially.

Other ingredients can also be included in the compositions. These can be selected from among additives commonly employed with plastics, such as fillers and/or reinforcements, strengthening fibers, plasticizers, colorants, dyes, flame retardants, antioxidants, pigments, mold release agents, drip retardants and so forth for their conventionally employed purposes in conventional amounts. Effective amounts are selected normally ranging from 1 to 60 parts by weight of the total composition weight.

In alternative embodiments, the compositions may include reinforcing fillers such as fibrous (filamentous) glass and/or graphite; mineral fillers such as mica, talc and the like, and preferably, clay. The filamentous glass suitable for use as reinforcement in such embodiments is well known to those skilled in the art and is available from a number of manufacturers. Use can be made of filaments of a lime-aluminum boro-silicate glass that is substantially soda-free. This is known as "E" glass. However, other glasses are useful, including the low soda glass known as "C" glass. The filaments are made by standard processes, e.g., by steam, air or flame blowing and, preferably, by mechanical pulling. The filaments preferably have diameters between about 0.00012" and 0.00075", but this is not critical to the present invention. The fillers can be untreated or treated with silane.

The length of the glass filaments and whether or not they are bundled into fibers and the fibers bundled in turn to yarns, robes or rovings, or woven mats are not of particular bearing upon the practice of the present invention. However, in preparing the molding compositions, it is convenient to use the filamentous glass in the form of chopped strands about ⅛" to about 2" long. In articles molded from the compositions, on the other hand, fibers of shorter length may be present because, during compounding, considerable fragmentation occurs. This is desirable, however, because the best properties are exhibited by thermoplastic injection molded articles in which the filament lengths are between about 0.0005" and 0.250".

The amount of the filler varies widely depending on the strength specifications which ar to be met, it being essential only that an amount is employed which is at least sufficient to provide some reinforcement. Preferably, however, the weight of the reinforcing fibers is between about 1 percent and about 60 percent of the combined weight of filler and the resinous components of the mixture.

The compositions of the present invention, with and without fibrous reinforcement and filler, can be rendered flame retardant with an effective amount of conventional flame retardant agent. As is well known, flame retardants can be based on elementary red phosphorus, phosphorus compounds, halogen and nitrogen compounds alone or, preferably, in further combination with synergists such as antimony compounds. Especially useful are polymeric and oligomeric flame retardant agents comprising tetrabromobisphenol-A carbonate units; See, for example, Wambach, U.S. Pat. No. 3,833,685 which is incorporated herein by reference.

The compositions can be prepared using any of the known procedures. In one such procedure, a preblend on the ingredients is formed, extruded on a single screw Brabender extruder or a twin screw 28 mm Werner-Pfleiderer extruder at a temperature of about 450° F. chopped, cut or ground to smaller size and injection molded at a temperature of about 400° F. into test bars of desired shape and size.

DETAILED DESCRIPTION OF THE PREFERRED EMBODIMENTS

The following examples illustrate the invention. They are not to be construed to limit the claims in any manner whatsoever. The PPE resin utilized in all of the Examples was of typical commercial grade had an intrinsic viscosity (IV) of about 0.4.

EXAMPLE 1-3

Varying ratios of polyphenylene ether (PPE) to low density polyethylene (LDPE) for a fixed amount of Kraton G-1650 are prepared. Example 1 provides a 60:45 ratio of PPE to LDPE by weight, Example 2 provides a 60:60 ratio of PPE to LDPE by weight; and Example 3 provides a 60:75 ratio of PPE to LDPE by weight.

In addition, comparisons A and B, which correspond to prior art compositions, were prepared in which the ratio of PPE to LDPE was 60:15 and 60:30 by weight, respectively. The physical properties of the resulting compositions are shown in Table 2.

TABLE 2

| | PPO/PO RATIOS | | | | |
|---|---|---|---|---|---|
| EXAMPLE | 1 | 2 | 3 | A* | B |
| COMPOSITION | | | | | |
| PPE ® (General Electric Co.) | 60 | 60 | 60 | 60 | 60 |
| LDPE | 45 | 60 | 75 | 15 | 30 |
| KG-1650 | 8 | 8 | 8 | 8 | 8 |
| PHYSICAL PROPERTIES | | | | | |
| Delamination | no | no | no | yes | yes |
| Vicat, °F. | 212 | 209 | 205 | — | 234 |
| Tensile Strength (psi × 10³) | 1.8 | 1.9 | 1.7 | — | 2.2 |
| Tensile Elongation (%) | 37 | 72 | 100 | — | 27 |
| Flexural Modulus (psi × 10³) | 34 | 33 | 32 | — | 55 |
| Flexural Strength (psi × 10³) | 1.3 | 1.3 | 1.3 | — | 2.1 |
| Notched Izod (ft.-lbs/in) | 4.7 | 7.3 | 8.6 | — | 2.1 |
| Dynatup falling dart impact strength R.T. | 9D** | 17D | 19D | — | 5B |
| −20° F. | 5B** | 20B | 25B | — | 4B |

*Reference A was too delaminated to collect the remaining data.
**"D" indicates failure in the ductile mode, while "B" indicates failure in the brittle mode.

As can be seen from the data provided in Table 2, between a 60:45 to a 60:75 ratio of PPE to LDPE, the delamination tendency, as well as the physical properties of the composition, are dramatically improved over the higher ratios of PPE to LDPE which are reflected in comparisons A and B.

EXAMPLES 4-7

Different polyolefins are utilized in the compositions of Examples 4-7. The ratio of ingredients in Examples 4-7 are 45 parts by weight PPE (PPO ®, General Electric Co.), 45 parts by weight polyolefin (PO), and 10 parts Kraton G-1650. In Example 4, the polyolefin is LDPE; in Example 5, the polyolefin is LLDPE; in Example 6, the polyolefin is MDPE; and in Example 7, the polyolefin is polypropylene (PP). The physical properties of these compositions are shown in Table 3.

TABLE 3

| EXAMPLE | 4 (LDPE) | 5 (LLDPE) | 6 (MDPE) | 7 (PP) |
|---|---|---|---|---|
| HDT (° @ 66 psi) | 116 | 105 | 145 | 235 |
| Tensile Strength (psi × 10³) | 2.0 | 1.9 | 2.7 | 3.8 |
| Tensile Elongation (%) | 84 | 144 | 181 | 83 |
| Flexural Modulus (psi × 10³) | 31 | 32 | 64 | 124 |
| Flexural Strength (psi × 10³) | 1.2 | 1.2 | 2.2 | 4.2 |
| Notched Izod (ft.-lbs/in) | 5.4 | 7.2 | 7.0 | 2.0 |
| Dynatup falling dart impact strength RT | 13D* | 19D | 22D | 8D |
| −20° F. | 14B* | 21B | 25B | 2B |

*"D" indicates failure in the ductile mode, while "B" indicates failure in the brittle mode.

As can be seen from Table 3, the good properties seen in Table 2 are not limited to LDPE. Rather, these properties are applicable to other polyolefins as well. These data show that a variety of different polyolefins can be utilized and result in property profiles that can be formulated to vary, depending upon the application and the polyolefin used.

EXAMPLES 8-10

Examples 8-10 are provided to show the delamination tendencies for a fixed polyphenylene ether to polyolefin ratio with variations in the Kraton elastomer. In particular, these Examples provide a ratio of 50 parts by weight PPE (General Electric Co. PPO ®) to 50 parts by weight LDPE, and 10 parts by weight Kraton. In Example 8, Kraton G-1650 is used; in Example 9, Kraton G-1652 is used; in Example 10, Kraton G-1651 was used. In addition, References C and D are provided wherein the Kraton is D-1101 and D-1102, respectively. The results obtained are shown in Table 4.

TABLE 4

| PPO (50): Example # | LDPE (50): Kraton added | Kraton (10) delamination |
|---|---|---|
| 8 | G-1650 | no |
| 9 | G-1652 | no |
| 10 | G-1651 | slight |
| C | D-1101 | yes |
| D | D-1102 | yes |

As is readily apparent, Examples 8 and 9 have no delamination tendencies, while Example 10 had slight delamination tendencies. Comparisons C and D delaminated.

Thus, it may be concluded that while the exact type of polyolefin utilized is not necessarily critical to prepare compositions having slight or no delamination tendencies, the type of compatibilizing elastomer utilized is critical. In other words, the blending of polyphenylene ethers and polyolefins is dependent on the structural aspects of the Kraton elastomer, and the ability of the Kraton to compatibilize the polyphenylene ether and polyolefin into non- or slightly-delaminating materials useful for injection molding applications.

Other experiments have been conducted which conform to the results shown in Table 4.

EXAMPLE 11

Injection molded test specimens of an alloy consisting of 42 parts polyphenylene ether resin, 52 parts LDPE and 6 parts Kraton G-1652 exhibit ductile properties and show no evident signs of delamination. The same blend made utilizing Kraton G-1651 instead of the Kraton G-1652 has poorer impact properties and shows signs of slight delamination in the gate region of injection molded parts but this can be overcome by adding more of the Kraton G-1651.

EXAMPLES 12-15 AND COMPARISON EXAMPLES E-F

The following blends of polyphenylene ether (PPE; General Electric PPO ®) and polypropylene (PP; Himont 6323) were made and evaluated. Kraton 1650 was used as the compatibilizer. The blends show that even at low levels of incorporation of KG 1650 the blends are effectively compatibilized. The results are set forth in Table 5.

TABLE 5

| EXAMPLE | 12 | 13 | 14 | E | 15 | F |
|---|---|---|---|---|---|---|
| COMPOSITION | | | | | | |
| PPO | 40 | 40 | 40 | 40 | 30 | 30 |
| PP | 60 | 60 | 60 | 60 | 70 | 70 |
| KG-1650 | 2 | 1 | 0.5 | — | 1 | — |
| PHYSICAL PROPERTIES | | | | | | |
| HDT (°F. @ 66 psi) | 222 | 225 | 234 | 263 | 224 | 251 |
| Tensile Strength (psi × $10^3$) | 4.5 | 4.6 | 4.9 | 3.3 | 4.4 | 3.1 |
| Tensile Yield (psi × $10^3$) | 4.3 | 4.5 | 4.9 | 3.4 | 4.4 | 3.4 |
| Tensile Elongation (%) | 29 | 22 | 17 | 5 | 30 | 10 |
| Flexural Strength (psi × $10^3$) | 5.4 | 5.5 | 6.1 | 5.5 | 5.4 | 5.8 |
| Flexural Modulus (psi × $10^3$) | 174 | 179 | 186 | 242 | 174 | 223 |

Compatibility of the compositions of the invention is evidenced by the substantial increases in tensile properties in comparison with the comparative compositions.

EXAMPLES 16-19 AND COMPARISON EXAMPLES G-I

The following blends of polyphenylene ether, PPE, (General Electric Company PPO ®) and high density polyethylene (Soltex Polymer Corp.—Fortiflex B-54-25-H-96) were made and evaluated. Again, KG 1650 was used as the compatibilizer in low levels of incorporation. The results are set forth in Table 6.

TABLE 6

| EXAMPLE | G | 16 | 17 | H | 18 | 19 | I |
|---|---|---|---|---|---|---|---|
| COMPOSITION | | | | | | | |
| PPE | — | 20 | 20 | 20 | 40 | 40 | 40 |
| HDPE | 100 | 80 | 80 | 80 | 60 | 60 | 60 |
| KG-1650 | — | 1 | 2 | — | 1 | 2 | — |
| PHYSICAL PROPERTIES | | | | | | | |
| HDT (°F. @ 66 psi) | 182 | 181 | 181 | 205 | 263 | 259 | 268 |
| Tensile Strength (psi × $10^3$) | 2.8 | 1.7 | 2.3 | 2.8 | 4.9 | 4.9 | 4.9 |
| Tensile Yield (psi × $10^3$) | 4.5 | 3.9 | 3.7 | 4.0 | 5.0 | 4.9 | 4.9 |
| Tensile Elongation (%) | 43 | 75 | 99 | 30 | 20 | 24 | 8 |
| Flexural Strength (psi × $10^3$) | 4.4 | 4.3 | 4.2 | 4.9 | 6.1 | 5.7 | 7.1 |
| Flexural Modulus (psi × $10^3$) | 166 | 166 | 156 | 187 | 208 | 202 | 223 |
| Notched Izod (ft.-lbs/in) | 6.1 | 1.4 | 9.4 | 0.3 | 0.5 | 0.6 | 0.5 |
| Dynatup falling dart impact strenght, ft.-lbs. R.T. | 24.1 | 9.0 | 19.3 | 1.0 | 6.0 | 7.7 | 0.9 |

EXAMPLES 20-23 AND COMPARISON EXAMPLES J-K

The following blends of polyphenylene ether, PPE, (General Electric Company PPO ®) and polypropylene (Shell 7129) were made and evaluated. The block copolymers and the amounts utilized were as set forth in Table 7.

TABLE 7

| EXAMPLE | J | 20 | 21 | 22 | 23 | K |
|---|---|---|---|---|---|---|
| COMPOSITION | | | | | | |
| PPE | 30 | 30 | 30 | 30 | 30 | 30 |
| PP | 70 | 70 | 70 | 70 | 70 | 70 |
| KG-1651 | — | 10 | — | — | — | — |
| KG-1650 | | | 10 | | | |
| KG-1652 | — | — | — | 10 | 4 | — |
| KG-1101 | — | — | — | — | — | 10 |
| PHYSICAL PROPERTIES | | | | | | |
| Tensile Yield (psi × $10^3$) | 4.1 | 3.3 | 2.9 | 3.0 | 3.6 | 3.4 |
| Tensile Elongation (%) | 30 | 85 | 270 | 270 | 123 | 17 |
| Flexural Modulus (psi × $10^3$) | 171 | 139 | 103 | 99 | 129 | 147 |
| Notched Izod (ft.-lbs/in) | 0.6 | 1.6 | 5.5 | 5.3 | 2.3 | 0.5 |
| Dynatup falling dart impact strenght | 1.5VB* | 20.6D | 31.4D | 33.9D | 25.6D | 1.2VB |

TABLE 7-continued

| EXAMPLE | J | 20 | 21 | 22 | 23 | K |
|---|---|---|---|---|---|---|
| ft.-lbs. R.T. | | | | | | |

*"D" indicates failure in the ductile mode; "VB" indicates very brittle failure.

EXAMPLES 24–25 AND COMPARISON EXAMPLES L-M

The following blends of polyphenylene ether, PPE, (General Electric Company PPO®) and linear low density polyethylene, LLDPE, (Union Carbide G7341) were made and evaluated. The block copolymers, and the amounts utilized, were as set forth in Table 8.

TABLE 8

| EXAMPLE | L | 24 | 25 | M |
|---|---|---|---|---|
| COMPOSITION | | | | |
| PPE | 40 | 40 | 40 | 40 |
| LLDPE | 60 | 60 | 60 | 60 |
| KG-1651 | — | 10 | — | — |
| KG-1650 | — | — | 10 | — |
| KD1102 | — | — | — | 10 |
| PHYSICAL PROPERTIES | | | | |
| Tensile Yield (psi × 10³) | 1.8 | 1.3 | 1.2 | 1.8 |
| Tensile Strength (psi × 10³) | 1.7 | 2.1 | 2.3 | 1.9 |
| Tensile Elongation (%) | 24 | 168 | 234 | 26 |
| Notched Izod (ft.-lbs/in) | 0.6 | 7.8NB | 8.0NB | 0.6 |
| Dynatup falling dart impact strenght, Ft.-lbs. (R.T.) | 2.7VB* | 24.9D | 31.6D | 4.2VB |

*"VB" indicates very brittle failure; "D" indicates failure in the ductile mode and "NB" indicates "no break."

Without being bound by any particular theory, the reasons for the improvements exhibited by blends of polyphenylene ether resin and polyolefin resin according to the present invention appear to involve both miscibility factors between the various blocks of the elastomer and the components of the alloy and also the block lengths and the ability of the block lengths to effectively entangle with the blend components to be effective effective compatibilizers.

In this regard, Kraton G-1652, G-1651 and G-1650 are not unique in performing this function but are simply commercially available materials.

The above-mentioned patents are hereby incorporated by reference.

Many variations of this invention will suggest themselves to those skilled in the art in light of the above detailed description. For example, as stated previously, many polyolefins not mentioned herein are suitable for obtaining a product having similar properties. All such obvious variations are within the full intended scope of the appended claims.

We claim:

1. A thermoplastic composition comprising essentially of:
    (a) polyphenylene ether resin, and
    (b) polyolefin resin, and
    (c) from 0.5 to about 20% by weight, relative to 100% by weight of (a) and (b), of a selectively hydrogenated block copolymer of a vinyl aromatic compound (A) and (A¹) and a conjugated diene (B), of the A-B-A¹ type, the center block B being of higher molecular weight than that of the combined terminal blocks A and A¹ wherein components (a) and (b) are present in a ratio of (a):(b) of less than about 2:1.

2. A composition as defined in claim 1 wherein said polyphenylene ether resin component (a) is a homopolymer or copolymer derived from units of the formula

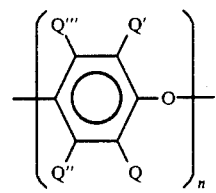

wherein the oxygen ether atom of one unit is connected to the benzene nucleus of the next adjoining unit; n is an integer of at least 20' wherein Q, Q', Q", and Q''' are independently selected from hydrogen, halogen, hydrocarbon radicals, halohydrocarbon radicals having at least two carbon atoms between the halogen atom and the phenyl nucleus, hydrocarbonoxy radicals, and halohydrocarbonoxy radicals having at least two carbon atoms between the halogen atom and the phenyl nucleus.

3. A composition as defined in claim 2 wherein each Q is alkyl having from 1 to 4 carbon atoms.

4. A composition as defined in claim 2 wherein each Q is methyl.

5. A composition as defined in claim 1 wherein said polyphenylene ether is poly(2,6-dimethyl-1,4-phenylene) ether.

6. A composition as defined in claim 1 wherein said polyphenylene ether is poly(2,6-dimethylco-2,3,6-trimethyl-1,4-phenylene) ether.

7. A composition as defined in claim 1 wherein said polyolefin resin component (b) is selected from the group consisting of LDPE, LLDPE, MDPE, HDPE, PP, high impact PP, and mixtures of any of the foregoing.

8. A composition as defined in claim 1 wherein components (a) and (b) are present in a ratio of (a): (b) of less than about 1.3:1.

9. A composition as defined in claim 1 wherein components (a) and (b) are present in a ratio of (a): (b) of less than about 1:1.

10. A composition as defined in claim 1 wherein components (a) and (b) are present in a ratio of (a): (b) of less than about 1:X where X is greater than 1.

11. A composition as defined in claim 1 wherein components (a) and (b) are present in a ratio of (a): (b) of less than about 1:X where X is greater than and up to about 4.

12. A composition as defined in claim 1 wherein the molecular weight of component (c) is from about 20,000 to about 200,000.

13. A composition as defined in claim 1 wherein the molecular weight of component (c) is from about 50,000 to 200,000.

14. A composition as defined in claim 1 wherein the molecular weight of component (c) is from about 50,000 to 100,000.

15. A composition as defined in claim 1 wherein in said component (A) and (A$^1$) are independently selected from styrene, α-methyl styrene, vinyl toluene, vinyl xylene and vinyl naphthalene and (B) is selected from one or more of ethylene, propylene and butylene.

16. A composition as defined in claim 15 wherein in said component (c), (A) is a styrene block, (B) is an ethylene butylene block, and (A$^1$) is a styrene block.

17. A composition as defined in claim 16 wherein in said component (c), terminal blocks (A) and have molecular weights of from about 7000 to about 30,000, respectively, and center block (B) has a molecular weight of from about 30,000 to about 120,000.

18. A composition as defined in claim 16 wherein in said component (c), terminal blocks (A) and (Al) have molecular weights of from about 7,000 to about 10,000, respectively, and center block (B) has a molecular weight of from about 35,000 to about 55,000.

19. A composition as defined in claim 1 wherein the weight ratio of (A) plus (A$^1$) to (B), (A+A$^1$): B, is from about 28:72 to about 33:67.

20. A composition as defined in claim 1 wherein component (c) is present in an amount of from about 0.5% by weight to about 10% by weight.

21. A method of improving the ductility and decreasing the tendency toward delamination of a composition comprised of polyphenylene ether resin and polypropylene resin comprising adding to the composition from 0.5 to about 20% by weight, relative to 100% by weight of (a) and (b), of a selectively hydrogenated block copolymer of a vinyl aromatic compound (A) and (A$^1$) and a conjugated diene (B), of the A-B-A$^1$ type, the center block B being of higher molecular weight than that of the combined terminal blocks A and A$^1$ wherein components (a) and (b) are present in a ratio of (a):(b) of less than about 2:1.

22. An article produced from the composition of claim 1.

23. An article produced by the method of claim 21.

24. A thermoplastic composition comprising
   (a) polyphenylene ether resin,
   (b) polyolefin resin, and
   (c) a selectively hydrogenated block copolymer of a vinyl aromatic compound (A) and (A$^1$) and a conjugated diene (B), of the A-B-A$^1$ type, the center block B being of higher molecular weight than that of the combined terminal blocks A and A$^1$ wherein components (a) and (b) are present in a ratio of (a):(b) of less than about 2:1.

25. A composition as defined in claim 24 in which component (c) is present in an amount of from 0.5 to about 50% by weight, relative to 100% by weight of (a) and (b).

26. A composition as defined in claim 24 in which component (c) is present in an amount of from 0.5 to about 30% by weight, relative to 100% by weight of (a) and (b).

27. A thermoplastic composition comprising:
   (a) a polyphenylene ether resin,
   (b) a polyolefin resin, and
   (c) between about 20% and about 30%, relative 100% by weight of (a) and (b) of a selectively hydrogenated block copolymer of a vinyl aromatic compound (A) and (A$^1$) and a conjugated diene (B), of the A-B-A$^1$ type, the center block B being of higher molecular weight than that of the combined terminal blocks A and A$^1$ wherein components (a) and (b) are present in a ratio of (a):(b) of less than about 2:1.

28. A thermoplastic composition consisting essentially of:
   (a) polyphenylene ether resin, and
   (b) polyolefin resin, and
   (c) from 0.5 to about 20% by weight, relative to 100% by weight of (a) and (b), of a selectively hydrogenated block copolymer of a vinyl aromatic compound (A) and (A$^1$) and a conjugated diene (B), of the A-B-A$^1$ type, the center block B being of higher molecular weight than that of the combined terminal blocks A and A$^1$ wherein components (a) and (b) are present in a ratio of (a):(b) of less than about 2:1.

29. A thermoplastic composition consisting essentially of:
   (a) polyphenylene ether resin, and
   (b) polyolefin resin, and
   (c) from 0.5 to about 20% by weight, relative to 100% by weight of (a) and (b), of a selectively hydrogenated block copolymer of a vinyl aromatic compound (A) and (A$^1$) and a conjugated diene (B), of the A-B-A$^1$ type, the center block B being of higher molecular weight than that of the combined terminal blocks A and A$^1$ wherein components (a) and (b) are present in a ratio of (a):(b) of less than about 2:1.

30. A thermoplastic composition consisting essentially of:
   (a) polyphenylene ether resin, and
   (b) polyolefin resin, and
   (c) a selectively hydrogenated block copolymer of a vinyl aromatic compound (A) and (A$^1$) and a conjugated diene (B), of the A-B-A$^1$ type, the center block B being of higher molecular weight than that of the combined terminal blocks A and A$^1$ wherein components (a) and (b) are present in a ratio of (a):(b) of less than about 2:1.

31. A thermoplastic composition consisting of:
   (a) polyphenylene ether resin,
   (b) polyolefin resin, and
   (c) a selectively hydrogenated block copolymer of a vinyl aromatic compound (A) and (A$^1$) and a conjugated diene (B), of the A-B-A$^1$ type, the center block B being of higher molecular weight than that of the combined terminal blocks A and A$^1$ wherein components (a) and (b) are present in a ratio of (a):(b) of less than about 2:1.

* * * * *